(12) United States Patent
Scharkowski (10) Patent No.: US 11,394,131 B2
(45) Date of Patent: Jul. 19, 2022

(54) ELECTRICAL CONDUCTOR AND METHOD FOR PRODUCING AN ELECTRICAL CONDUCTOR

(71) Applicant: Auto-Kabel Management GmbH, Hausen i.W. (DE)

(72) Inventor: Oliver Scharkowski, Cottbus (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 17/430,214

(22) PCT Filed: Jan. 22, 2020

(86) PCT No.: PCT/EP2020/051451
§ 371 (c)(1),
(2) Date: Aug. 11, 2021

(87) PCT Pub. No.: WO2020/169295
PCT Pub. Date: Aug. 27, 2020

(65) Prior Publication Data
US 2022/0085523 A1    Mar. 17, 2022

(30) Foreign Application Priority Data

Feb. 20, 2019 (DE) ..................... 10 2019 104 318.2

(51) Int. Cl.
*H01R 4/02* (2006.01)
*B23K 20/06* (2006.01)
(Continued)

(52) U.S. Cl.
CPC ............. *H01R 4/029* (2013.01); *B23K 20/06* (2013.01); *B23K 20/129* (2013.01); *H01R 4/625* (2013.01);
(Continued)

(58) Field of Classification Search
CPC .... H01R 4/029; H01R 4/625; H01R 43/0214; H01R 2201/26
(Continued)

(56) References Cited

U.S. PATENT DOCUMENTS 4,342,893 A * 8/1982 Wolf .................... H01H 11/045
428/673
4,803,322 A * 2/1989 Shibata .............. H01H 1/02372
428/673
(Continued)

FOREIGN PATENT DOCUMENTS

DE    10 2004 034 497 A1    2/2006
DE    10 2006 050 708 A1    5/2008
(Continued)

OTHER PUBLICATIONS

International Searching Authority/EP, International Search Report and Written Opinion of the International Searching Authority, Application No. PCT/EP2020/051451, dated Mar. 25, 2020, with English translation of the International Search Report, 18 pages.

*Primary Examiner* — Alexander Gilman
(74) *Attorney, Agent, or Firm* — Sunstein LLP (57) ABSTRACT

An electrical conductor, in particular a flat conductor, comprising at least one through opening, and a contact part connected to the conductor at the through opening in a substance-to-substance bond, the contact part having an axially extending first section and a radially extending second section, characterized in that the second section is formed as a flange and a side of the flange facing the conductor has a surface having at least one recess and/or at least one protrusion and a surface welded to the conductor.

19 Claims, 6 Drawing Sheets

(51) Int. Cl.
    *B23K 20/12*     (2006.01)
    *H01R 4/62*     (2006.01)
    *H01R 43/02*     (2006.01)
    *B23K 101/38*     (2006.01)

(52) U.S. Cl.
    CPC ...... *H01R 43/0214* (2013.01); *B23K 2101/38* (2018.08); *H01R 2201/26* (2013.01)

(58) Field of Classification Search
    USPC .......................................................... 439/489
    See application file for complete search history.

(56) References Cited

U.S. PATENT DOCUMENTS

| | | | | |
|---|---|---|---|---|
| 5,421,084 | A * | 6/1995 | Wolf | H01H 11/045 |
| | | | | 29/874 |
| 5,598,629 | A * | 2/1997 | Schneider | H01H 11/045 |
| | | | | 29/268 |
| 5,883,352 | A * | 3/1999 | Wolf | H01R 43/0214 |
| | | | | 219/56.22 |
| 6,340,805 | B1 * | 1/2002 | Ljokkoi | D21D 5/16 |
| | | | | 140/112 |
| 2002/0046864 | A1 * | 4/2002 | Bellino | H01R 4/10 |
| | | | | 174/70 B |
| 2012/0125654 | A1 * | 5/2012 | Van Swearingen | H01R 4/26 |
| | | | | 29/857 |
| 2014/0144015 | A1 * | 5/2014 | Mayer | B23K 20/1265 |
| | | | | 29/748 |
| 2015/0217395 | A1 * | 8/2015 | Spinella | F16B 37/061 |
| | | | | 403/267 |
| 2016/0006138 | A1 * | 1/2016 | Harms | B23K 11/0026 |
| | | | | 174/74 A |
| 2019/0199079 | A1 * | 6/2019 | Specht | H01R 43/0249 |
| 2019/0319375 | A1 * | 10/2019 | Scharkowski | H01R 43/0207 |
| 2020/0136278 | A1 * | 4/2020 | Forstmeier | B23K 20/129 |
| 2020/0266595 | A1 * | 8/2020 | Goetzmann | H01R 4/023 |
| 2021/0265748 | A1 * | 8/2021 | Scharkowski | H01R 4/625 |

FOREIGN PATENT DOCUMENTS

| | | |
|---|---|---|
| DE | 10 2008 056 133 A1 | 5/2010 |
| DE | 20 2015 100 319 U1 | 3/2015 |
| DE | 10 2016 013 700 A1 | 5/2017 |
| EP | 0 726 613 A2 | 8/1996 |
| WO | WO 2017/167463 A1 | 10/2017 |

* cited by examiner

ELECTRICAL CONDUCTOR AND METHOD FOR PRODUCING AN ELECTRICAL CONDUCTOR

CROSS-REFERENCE TO RELATED APPLICATIONS

This application is the national phase entry of international patent application no. PCT/EP2020/051451, filed Jan. 22, 2020 and claims the benefit of German patent application No. 10 2019 104 318.2, filed Feb. 20, 2019, the disclosures of which are incorporated herein by reference in their entirety.

TECHNICAL FIELD

The subject matter relates to an electrical conductor and a method for manufacturing an electrical conductor, in particular a battery conductor, especially in the form of a flat conductor, in particular for automotive applications.

BACKGROUND ART

In the automotive industry, flat conductors (also referred to as strip conductors) have recently been increasingly used instead of round conductors. In particular for battery cables, preferably the B+ cable, on which high currents flow, the flat strip conductor has proven to be advantageous. With the help of the flat strip conductor, it is possible to realize large conductor cross sections in small installation spaces, especially narrow, inaccessible areas, due to the form factor, which improves the current carrying capacity of the battery conductors. Flat strip conductors are also increasingly used for electric vehicles, where voltages of several 100V are called up via the battery cables. Here, too, the power conductors must meet high requirements in terms of current-carrying capacity and performance.

However, round conductors continue to be used for contacting electrical consumers. This is mainly due to the fact that the electrical consumers mostly have to be contacted via flexible cables. When installing the connecting cables between rigid battery cables and electrical consumers, it is often necessary to thread the cables into tight installation spaces, which is easier with the aid of round conductors than with rigid flat conductors. Therefore, when flat conductors are used as the main strand for the battery cable, contacting between the flat conductor and the round conductor is essential. Such a contact can be made, for example, by means of a connecting stud. A round conductor can then be electrically contacted to the connecting stud, for example by means of friction welding. Taps to electrical consumers can be arranged at various points along the flat conductor. The cable harness formed in this way can be installed in a motor vehicle and the electrical consumers are connected to the battery harness via the round conductors.

However, it has been shown that the attachment of connection studs to flat conductors is problematic in many cases. Such connections must be electrically stable and protected from environmental influences. If aluminum is used as the conductor material of the flat-conductor, it must also be ensured that it does not deform when the connecting stud is connected. Particularly when the connecting stud is screwed in, the screw may press into the aluminum. Due to the relatively high viscosity of aluminum compared to other metals, the problem is that torques for the screw connections of the connecting stud may not be maintained. In addition, the screw connections may loosen under mechanical stress, as the aluminum of the flat conductor may deform under the screw connections. In addition, junctions between aluminum and more noble metals, such as copper, are susceptible to contact corrosion. Direct connection points must be protected from environmental influences.

DE 0 758 107 A describes a process for the production of a cable lug made of aluminum or an aluminum alloy, the eye of the cable lug is provided with a protective layer, characterized in that the eye of the cable lug is first coated by electroplating with a layer of material which is a good conductor of electricity and, to protect the sensitive thin electroplated layer, an eyelet which lines the bore of the eye and consists of the same materials is applied thereto in any desired manner as a further stronger protective layer and with its flanges completely or partially covering the contact surfaces of the eye.

WO 2006/057592 A1 further discloses a method and an apparatus for connecting an electrical conductor to a metal rod, for example a railroad rail, by means of a screwed connection. The document also relates to a tool for fixing a sleeve in the metal bar. The sleeve forms part of the bolted connection.

From DE 10 2006 050 708 A1 a friction welding sleeve is known, which is welded into an opening of a flat conductor.

Metallic coatings of the connection eye and/or the flat conductor are problematic for the contact between the connection eye and the flat conductor. The coating material usually has different mechanical and chemical properties than the material of the connection eye or the conductor. Coating materials, especially nickel, may have a higher melting point and/or a higher hardness. In the case of welding, this is disadvantageous because the welding process is impeded by different melting points of the joining partners.

The subject matter was thus based on the object of simplifying the connection between a conductor and a contact part by means of welding.

SUMMARY OF THE INVENTION

According to the subject matter, a conductor, in particular a flat conductor (flat strip conductor) with a through opening is provided. The through opening is preferably a bore. The bore may be cylindrical or frustoconical. The bore is preferably adapted to the contact part inserted into the through opening, which is also provided for the purpose of the present subject matter, in particular to the cross-section of the contact part in its first section.

Particularly when using a conductor according to the subject matter in automotive applications, for example as an electrical energy conductor, for example as a battery conductor, for example as a B+ conductor or B− conductor or as a conductor in an at least double-layer cable, there is always the challenge of providing electrical outlets on the conductor. Especially in automotive applications, the electrical conductors are exposed to challenging operating and environmental conditions. The environmental conditions can be highly variable, so that connection points on the electrical conductor are exposed to strongly fluctuating temperatures, humidity, electrolytes and the like. These environmental conditions, which in particular also lead to thermal expansion or accelerate contact corrosion, require the bolt to be fastened to the electrical conductor as securely as possible. On the other hand, an electrical conductor is subjected to dynamic loads, especially in automotive applications. An electrical tap formed by a bolt/stud must also be able to withstand these dynamic loads and must always be arranged on the electrical conductor in a secure and electrically well-conducting manner.

In order to enable a connection between an electrical conductor and a tap, for example a bolt/stud, in particular a screw or the like, it is proposed that a contact part welded in a material bond on or in the through opening is provided. The material bond of the contact part to the conductor ensures secure contacting on the conductor. The contact part can be formed as a sleeve with a through hole.

However, attaching the contact part to the opening is demanding in terms of process technology.

In particular, if the contact part has a metallic coating, a welded connection may be problematic in terms of process technology. If the coating material has a different melting temperature and/or surface hardness than the conductor, problems can arise during welding. In particular, in a friction welding process, a magnetic pulse welding process and a resistance welding process, the desired interaction between the joining partners may not occur due to the different melting temperature. For welding, it is necessary for both joining partners to be melted. If one of the joining partners has a surface made of a material with a very high melting temperature, this may not happen. The higher melting temperature requires a higher energy input to cause melting.

The contact part can be formed from at least two sections. The two sections extend in the axial direction of the contact part. A first section has a first circumference and a second section has a second, larger outer circumference than the first outer circumference. The second section can thus project radially outwardly relative to the first section. When attaching the contact part to the through opening of the conductor, the contact part is preferably inserted with the first section into the through opening of the conductor. The second section causes the insertion depth of the contact part in the through opening of the conductor to be limited, since the second section forms a stop.

After the contact part has been inserted into the through opening of the conductor, the friction welding process can begin. During the friction welding process, the contact part is preferably welded in the area of the contact surface between the flat conductor and the second section by means of friction welding. By applying a contact pressure to the contact part, the second section is pressed against the surface of the conductor. It has been recognized that it is in this area that the highest welding energy occurs, and in particular this area will be welded first by means of friction welding.

The second section is preferably formed as a flange and serves, on the one hand, as a contact surface on the flat conductors and, on the other hand, as an enlarged support surface for a connecting bolt or a connection of a consumer. The contact surface is the surface facing the conductor. The bearing surface is the surface opposite the conductor. In contrast to the contact surface, the bearing surface is preferably flat. A head of a connecting bolt or a nut or washer screwed to the connecting bolt can rest on the surface of the flange facing away from the flat conductor. Also, a terminal of a consumer can be placed on the bearing surface. The bearing surface may be round, rectangular, square, polygonal or the like. Along the circumference, the bearing surface may have radially more outwardly projecting portions and radially less outwardly projecting portions. The bearing surface may have a single-axis, two-three-axis, or multi-axis geometry. The bearing surface can have a roughness that is greater than the roughness of the surface of the flat conductor. This can promote contacting of a contact to the bearing surface, for example by friction welding.

It has been found that it is particularly advantageous if the first and second sections are formed in one piece. In particular, the contact part can be formed as a stamped or lathed part. Being formed in one piece prevents the contact part from being damaged during the welding process, in particular prevents a connection between the first and second sections from being dissolved. On the other hand, it is achieved that the contact part permanently withstands dynamic environmental conditions.

It is now proposed to increase the contact pressure and thus also the energy introduced at the contact point between the contact part and the flat conductor by forming the contact point in the area of the flange of the contact part and by the flange having recesses and/or protrusions in the area of the surface facing the conductor (contact surface). Thus, during welding, the contact surface of the contact part, i.e. the surface of the flange facing the conductor, rests on the conductor with only a small contact area. The entire welding energy is introduced into this small contact surface, so that considerably higher temperatures are possible with the same contact pressure. This causes both the contact part, in particular a coating of the contact part, and the conductor to melt. During welding, a significantly higher surface pressure occurs at the beginning of the welding process. The material of the conductor as well as the material of the contact part and/or its coating melt. The melted material, in particular that of the conductor, can thus flow into recesses of the contact surface and harden there after welding, so that in addition to a material connection, a form fit can also be produced.

According to an embodiment, it is proposed that the surface facing the conductor is relief-shaped, in particular regularly relief-shaped. The protrusions of the structured surface preferably lie in the same plane at their culmination points and on the conductor during the welding process. The respective local maxima of the protrusions are small in area, so that there is only a small contact area, and thus the contact pressure is considerably higher for the same contact force than for a full-surface contact of the flange on the conductor. This increased contact pressure leads to improved melting of both joining partners.

A protrusion may be referred to as a mountain, and a recess may be referred to as a valley.

It is also proposed that the surface facing the conductor is formed in a bump shape, in particular in a regular bump shape. The bumps may have mountains and valleys. A majority of the mountains, in particular all of the mountains of the bumps may lie in the region of their culmination points in a plane. A majority of the valleys, in particular all valleys, can also lie in the region of their culmination points in a plane.

In rotary friction welding in particular, the contact part is preferably rotated about its center. In order to achieve good welding results in this process, it is proposed that the at least one recess and/or the at least one protrusion be circumferential. In this case, the recess and/or the protrusion can run circumferentially to the center point, in particular circularly to the center point of the surface facing the conductor. It is also possible for a recess or a protrusion to extend only over a certain angular section. Between two adjacent recesses or protrusions, areas may be formed in which the surface facing the conductor is unchanged. Thus, a circumferential protrusion may be formed by a plurality of angular sections spaced apart from each other, in each of which a protrusion is formed, in particular in an arc segment around the center point.

According to one embodiment, it is proposed that the at least one protrusion is undercut. The applied welding energy melts the material of the conductor and/or contact part, which may also be referred to as plasticizing. When the material of the conductor and/or contact part is plasticized, the plasticized material can flow into the undercut. After the material has cured, therefore, not only is a material bond formed in the region of the intermetallic connection, but also a form fit is formed in the region of the cured material in the undercut. In particular, the protrusion is formed in a drop-shaped or omega-shaped manner in the surface.

According to an embodiment, it is proposed that the protrusion has arcuate, in particular part-circular, surface sections. In a cross-section parallel to the longitudinal axis of the contact part, the protrusion may have arcuate, in particular part-circular sections. In this context, it is possible that an upper culmination point of the protrusion is formed in the region of a concave surface section. In a convex region, an undercut may be formed.

According to an embodiment, it is proposed that the at least one recess has arcuate, in particular part-circular surface sections. In particular, in a section parallel to the longitudinal axis of the contact part, arcuate, in particular part-circular sections may be formed in the region of the recess. In particular, the recess is formed by a convex region.

According to an embodiment, it is proposed that the contact part is metallically coated. A metallic coating can in particular be a tin plating or a nickel plating. In particular, a coating can also be multilayered, in particular tin-plated with a sub-nickel-plating.

According to an embodiment, it is proposed that the contact part is formed as a welding eye. Such a welding eye is particularly suitable for subsequent screwing to a bolt, to which the round conductor can be arranged.

According to an embodiment, it is proposed that the first section is formed as a rod-shaped or tubular section.

The second section, in particular the flange may have a round or angular base.

A through hole may penetrate both the first section and the second section. The through-hole may be located in the region of a center of the first and second sections in a section perpendicular to the longitudinal axis of the contact member. The through-hole may be round or angular, with areas projecting radially further outward and areas projecting radially less outward, in particular formed as a multi-edge or a multi-round shape.

During rotary friction welding, the contact part must both be pressed against the conductor with a sufficiently large contact pressure and simultaneously be set in rotation. A friction welding tool must thereby, while rotating and setting the contact part in rotation, also simultaneously press the contact part against the conductor.

It has been found that electrical contacting of an electrical tap on the contact part is sufficiently good even if the bolt/stud required for this purpose does not lie directly against the inner circumference of the contact part formed as a sleeve. It is sufficient if a bolt head rests against the contact part on the end face. Then a sufficiently good electrical contact is possible. On the other hand, this leads to the fact that neither a form fit is necessary between the through opening in the contact part or the inner circumferential surface of the through opening in the contact part and the outer circumferential surface of the bolt, nor do the cross sections have to be complementary to each other. Rather, it has been recognized that it is advantageous for the manufacturing process if a through opening is provided in the contact part which is formed as an inner polygon. The inner circumference of the through opening is preferably formed as a polygon. On the other hand, the outer circumference of the contact part is preferably substantially round or angular.

In this context, it should be mentioned that the term polygonal socket can also be understood to mean a socket with various archs. In particular, the through opening is formed as a driving profile, with sections of smaller radius and sections of larger radius, the sections being alternately successive. A particularly good fit of the contact part to the through opening is achieved by the outer circumference of the first section tapering from the second section in the axial direction of the through opening. The first section is preferably frustoconical in shape.

The inner circumference of the through opening of the conductor is substantially congruent with the outer circumference of the rod- or tube-shaped second section of the contact part. On the other hand, the inner circumference of the through opening in the contact part is formed in a polygonal shape and is neither congruent with the outer circumference thereof nor congruent with a stud insertable into the through opening of the contact part.

The extension of the first section in the axial direction preferably corresponds to the material thickness of the electrical conductor in the direction of the through opening. It is then ensured that the first section preferably lies flush with the through opening of the electrical conductor.

As mentioned before, the problem of contacting between the flat conductor and the round conductor preferably arises in the case where the flat conductor is formed of aluminum. The use of an aluminum material as the material for the flat conductor has great advantages in terms of material cost and weight, so that it is preferred that the flat conductor is formed of an aluminum material or an alloy thereof.

The contact part can be formed from a transition metal material or an alloy thereof. It is preferred that a stainless steel, copper or brass sleeve be used. By using the contact part made of a material other than aluminum, there are two advantages. First, aluminum oxide is prevented from degrading the electrical contact between the terminal stud and the lead. Second, when a harder material than aluminum is used, the mechanical strength of the connection between the flat cable and the terminal stud can be increased. If stainless steel, copper or brass is used, it can be ensured that the mechanical stress does not cause any significant deformation of the contact part when the connection bolt is screwed through the contact part. It is also ensured that the end faces of the contact part do not deform significantly when subjected to continuous mechanical stress, so that a permanently strong connection between the connecting bolt and sleeve is guaranteed. The contact part can also be metallically coated, whereby a coating can be formed in particular from nickel, tin or alloys thereof. A coating of the contact part may be adapted to a material of a terminal stud, a screw, a terminal of a consumer or the like.

In another aspect, there is provided a contact part for contacting with an electrical conductor in the manner described above. The collar (flange) of the contact part in the region of the second section is formed with at least one recess and/or protrusion on a side that is brought into contact with the conductor.

According to a further aspect, a method of manufacturing an electrical conductor is proposed. Here, a previously described electrical conductor is brought into contact with a previously described contact part in such a way that the contact part is welded to the conductor by means of resistance welding, in particular protrusion welding, friction welding, in particular rotation friction welding, or magnetic pulse welding. Due to the relief-shaped surface, the contact part rests on the conductor in the area of the flange with only a small contact area. The welding energy admitted during welding is thus distributed over the very small contact area, so that even a coating of the contact part with a material that has a high melting point melts. This produces a secure, material-to-material connection between the contact part and the conductor.

The contact part is first brought into contact with the conductor by means of the protrusions. The culmination points of some or all of the protrusions preferably lie in one plane. In this plane, contact is made with the conductor. Energy is then introduced into the contact surface thus formed, by means of one of the welding processes mentioned above. This introduced energy plasticizes both the surface of the contact part and the surface of the conductor. The plasticized material can flow into a recess and harden there after welding. As a result, a form-fit connection is produced in addition to a material-fit connection.

BRIEF DESCRIPTION OF THE DRAWINGS

The subject-matter is explained in more detail below with reference to drawings showing embodiments. The drawings show in.

DETAILED DESCRIPTION OF SPECIFIC EMBODIMENTS

Figure 1:
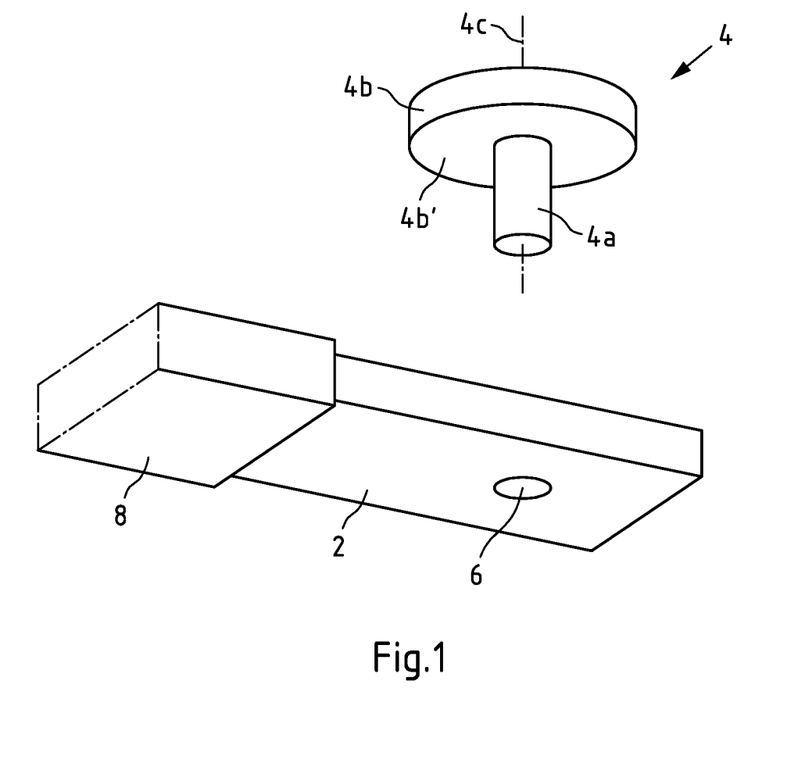
FIG. 1 a conductor with a contact part.

FIG. 1 shows an electrical conductor 2 with a contact part 4. The electrical conductor 2 has a through opening 6. The electrical conductor 2 is formed in particular as a flat conductor. In particular, the electrical conductor 2 has a flat surface facing the contact part. In particular, the through opening 6 is formed in the region of a front end of the conductor 2. The conductor 2 is preferably surrounded by an insulation 8 remote from the front end. The conductor 2 is preferably made of an aluminum material or a copper material.

The contact member 4 has a first section 4a and a second section 4b. In the direction of the longitudinal axis 4c of the contact part 4, the first section 4a extends tubularly or rod-like. Radially outwardly, the second section 4b extends in the form of a flange. The second section 4b has a contact surface 4b' which faces the conductor 2 in the connected state. This contact surface 4b' is profiled, as will be shown below.

Figure 2A:
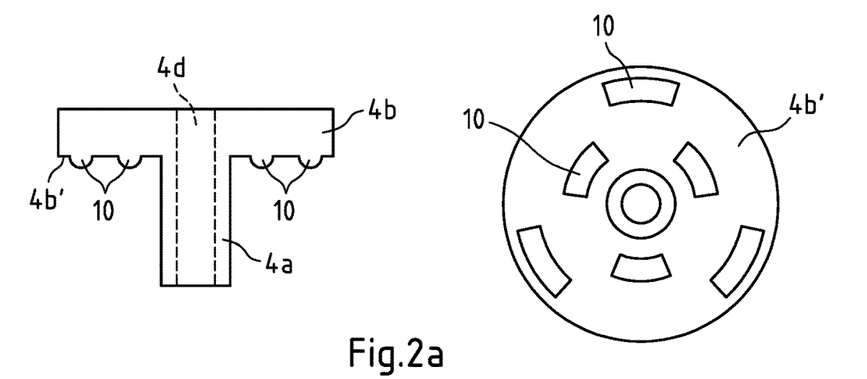
FIG. 2a-e various contact parts according to embodiments.
Figure 2B:
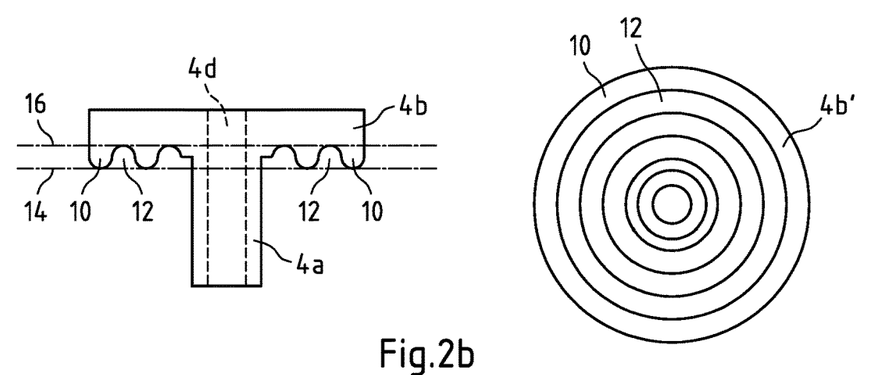
Figure 2C:
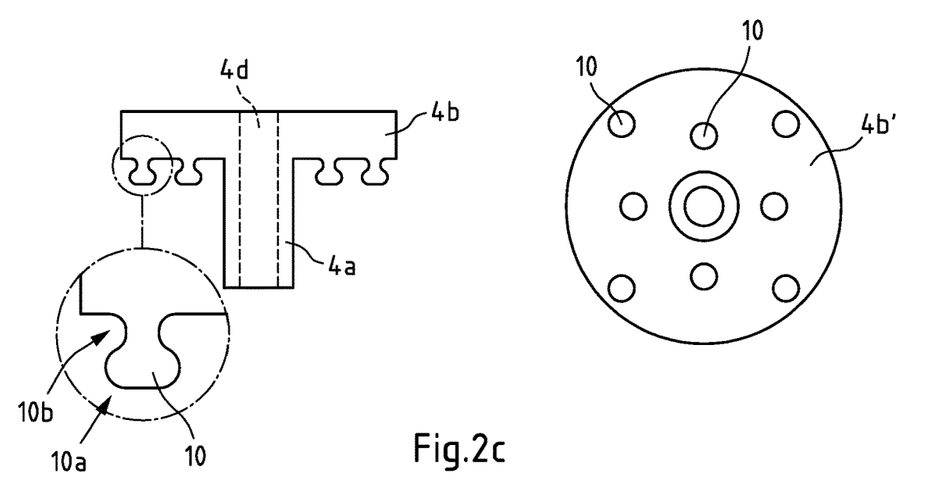

FIGS. 2a-c each show on the left side a cross-section parallel to the longitudinal axis 4c and a bottom view perpendicular to the longitudinal axis 4c of the contact surface 4b'.

FIG. 2a shows a contact part 4 in which the contact surface 4b' has protrusions 10. The protrusions 10 are applied to the contact surface 4b' in a part-circle shape in the form of a bead. A through hole 4d extends through the first section 4a as well as the second section 4b in the direction of the longitudinal axis 4c.

The protrusions 10 extend circumferentially around the through hole 4d in angular sections. FIG. 2a shows that in each case, the protrusions 10 are spaced apart from one another in angular sections. In particular, two or more protrusions 10 can be provided radially from the inside to the outside. The angular sections occupied by the protrusions 10 can be intermittent, as shown in FIG. 2a, or overlapping each other.

FIG. 2b shows a contact part 4 with protrusions 10 and recesses 12. It can be seen that the culmination points of the protrusions 10 lie in a first plane 14 and the culmination points of the recesses 12 lie in a second plane 16.

In the view of the contact surface 4b', it can be seen in FIG. 2b that the protrusions 10 and recesses 12 are formed completely circumferentially, circularly around the through opening 4d.

FIG. 2c shows protrusions 10 with undercuts. The protrusion 10 has a convex portion 10a and a concave portion 10b. The concave region 10b is formed as an undercut. The protrusion 10 according to FIG. 2c is formed in an omega shape. On the surface 4b', the protrusions 10 can be irregularly or regularly distributed. A regular distribution is shown in FIG. 2c.

Figure 2D:
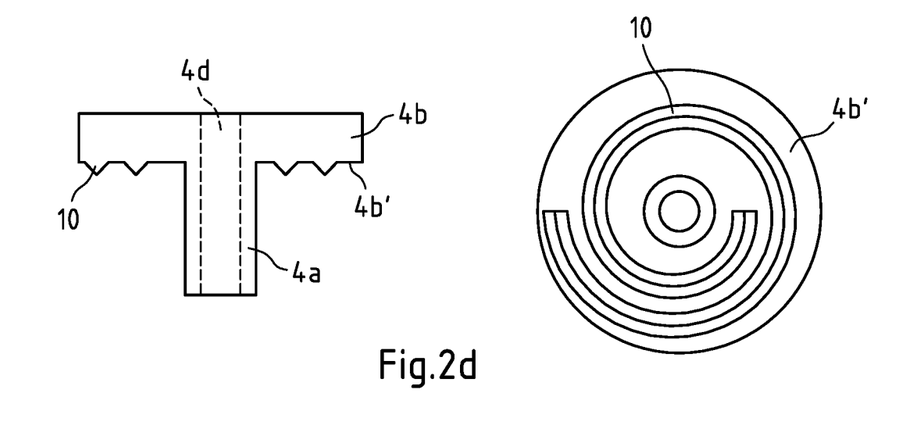

FIG. 2d shows protrusions 10 which are formed in a thorn shape and are arranged circumferentially on the contact surface 4b'.

Figure 2E:
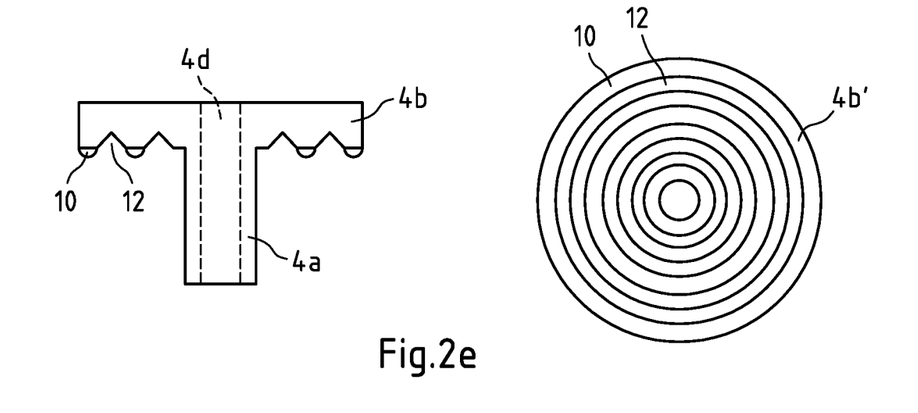

FIG. 2e shows part-circular protrusions 10 as well as angular recesses 12. Here, too, the protrusions 10 and recesses 12 may be arranged circumferentially on the contact surface 4b'. It is understood that the arrangement of the protrusions 10 and recesses 12 on the surface 4b can be freely varied in a completely circumferential, partially circumferential, angular, intermittent or overlapping, regular or irregular manner.

Figure 3A:
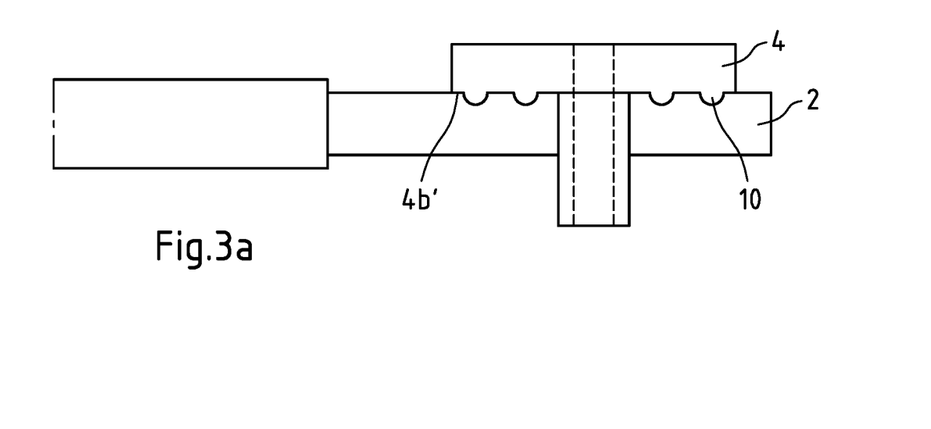
FIG. 3a-c various contact parts with conductors according to embodiments.

FIG. 3a shows the contact part 4 according to FIG. 2a on a conductor 2. It can be seen that the protrusions 10 have penetrated the material of the conductor 2 during welding. The plasticized material has hardened in the area of the distance between the protrusions 10. The contact surface 4b' lies completely on the conductor 2.

Figure 3B:
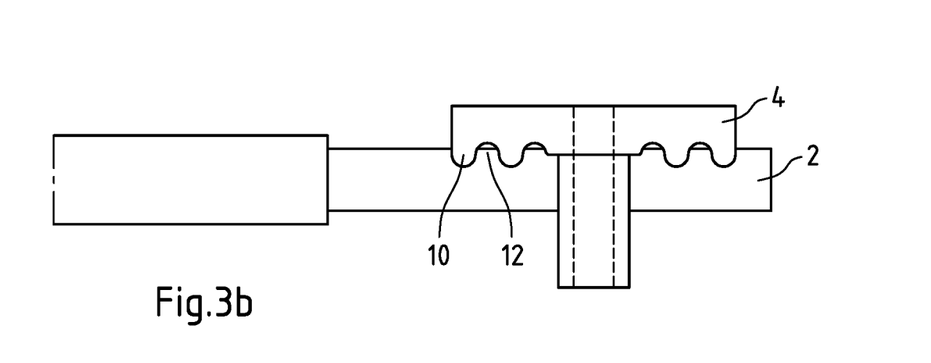

FIG. 3b shows a contact part 4 according to FIG. 2b in connection with a conductor 2. Here, too, the protrusions 10 have penetrated the material of the conductor 2.

Figure 3C:
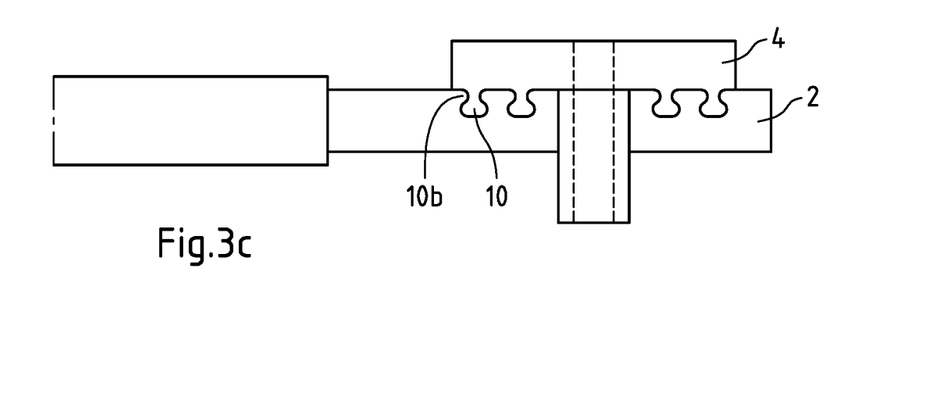

FIG. 3c shows a contact part 4 according to FIG. 2c on a conductor 2. During welding, the material of the conductor 2 plasticizes and thus flows into the undercuts 10b of the protrusions 10.

Figure 4A:
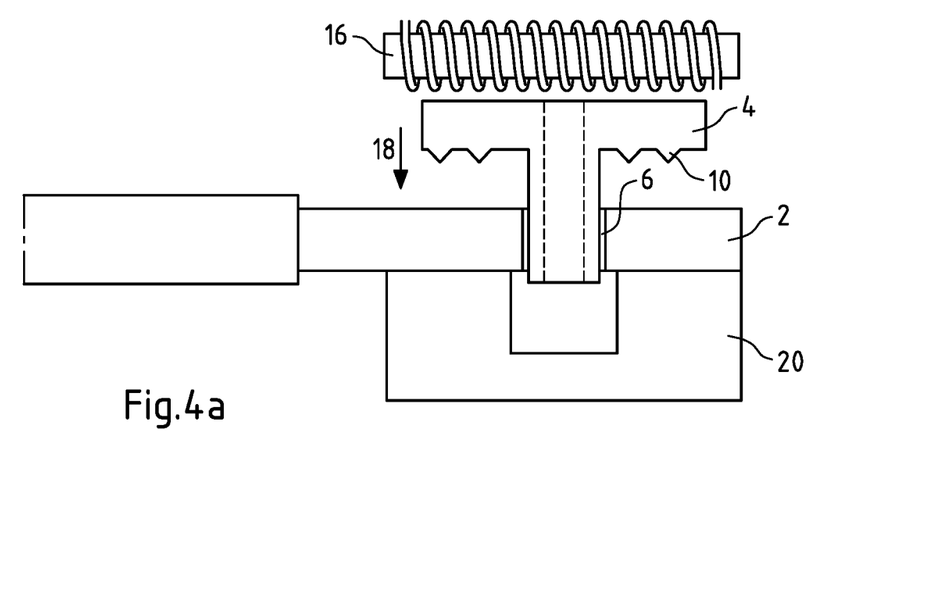
FIG. 4a-c the connection of the contact part to the conductor by means of welding according to embodiments.

FIG. 4a shows a welding of a contact part 4 to a conductor 2 by means of electromagnetic pulse welding. A coil 16 is energized, causing the contact part 4 to accelerate in the direction 18 toward the conductor 2. The conductor 2 is supported on a counter bearing 20. The contact part 4 is accelerated through the through hole 6 in the direction 18. The protrusions 10 strike the surface of the conductor 2. This results in both deformation and plasticizing of the materials, so that a substance-to-substance and/or form-fit connection is formed.

Figure 4B:
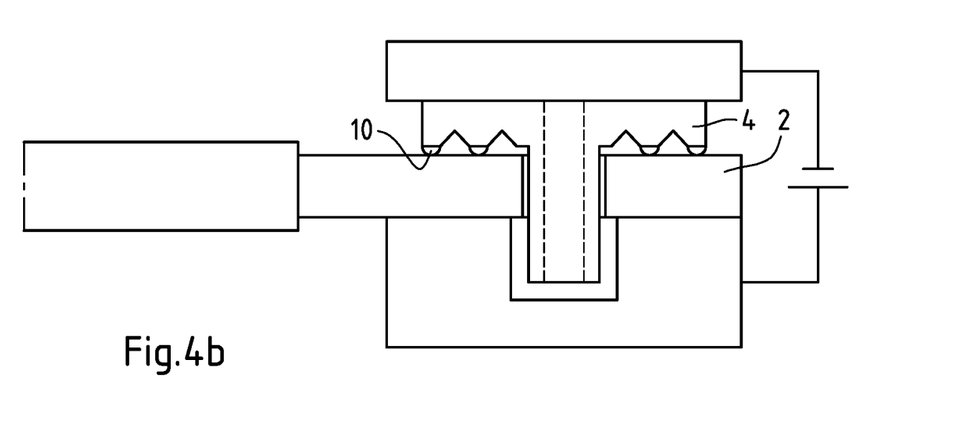

FIG. 4b shows a resistance welding process. In this process, the protrusions 10 are brought into contact with the conductor 2. The contact part 4 is energized with an electrode and the conductor 2 is also energized with an electrode. Due to the small contact area between the contact part 4 and the conductor 2 in the area of the protrusions 10, high contact resistances occur, so that the material of the contact part 4 as well as the material of the conductor 2 melts. Due to the small contact area, not only the material of the conductor 2 but possibly also a coating material of the contact part 4 melts.

Figure 4C:
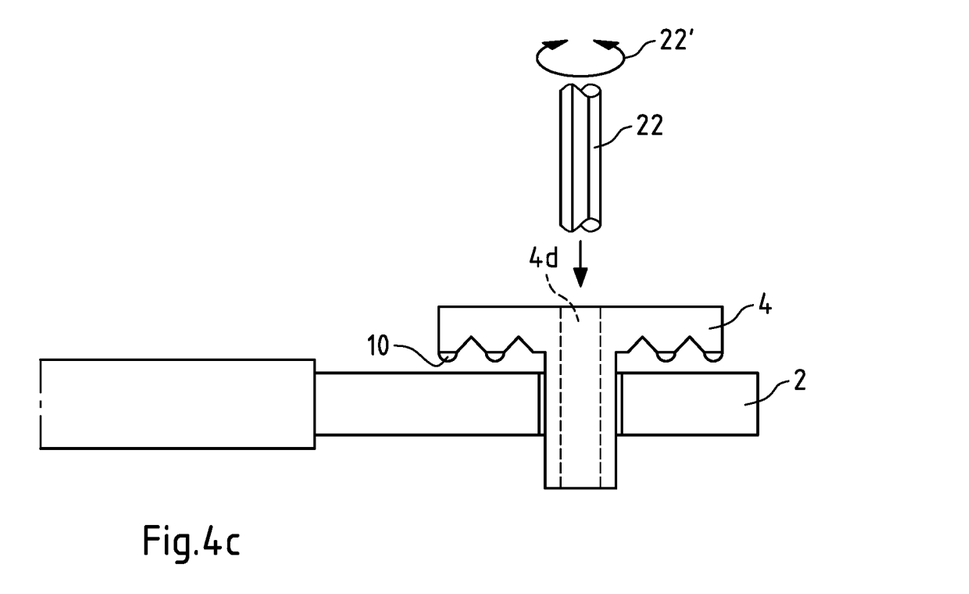

FIG. 4c shows a rotary friction welding process in which a rotary punch 22 is inserted into the through hole 4d. The rotation stamp may be applied as a polygon in an inner polygon of the through hole 4d. The rotary punch 22 is rotated in the direction 22', and then the contact part 4 with the protrusions 10 rests on the conductor 2 and the materials plasticize.

Figure 5:
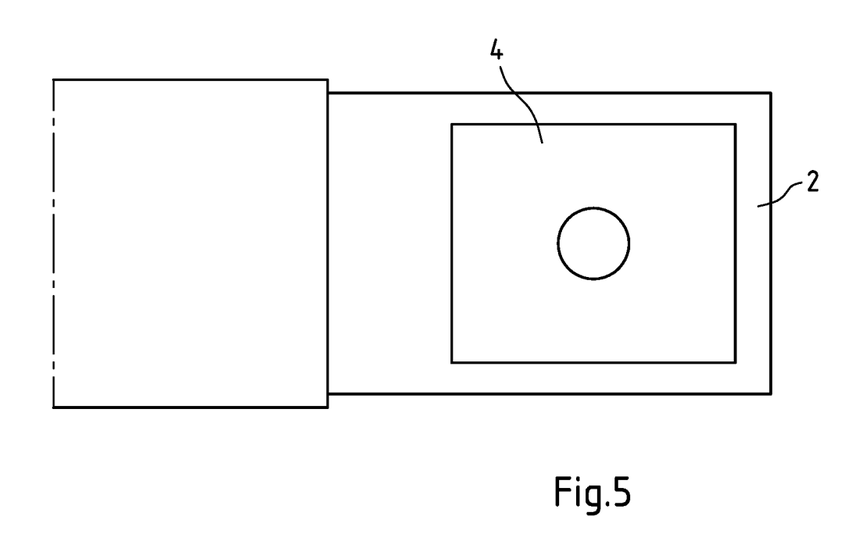
FIG. 5 a top view of a conductor with a contact part.

FIG. 5 shows a top view of a contact part 4. It can be seen that the contact part 4 has a square base.

With the aid of the contact part shown, it is possible to ensure reliable welding even if the contact part is metallically coated, in particular with a material having a high melting point, in particular a melting point higher than the melting point of the conductor and/or of the contact part 4.

What is claimed is:

1. Electrical conductor comprising:
    a flat conductor;
    at least one through opening in the flat conductor; and
    a contact part connected to the flat conductor at the through-opening in a material bond, the contact part having in its axial direction a first section and a second section, wherein
    the second section is formed as a flange and a side of the flange facing the flat conductor has a surface welded to the flat conductor and which has at least one recess and/or at least one protrusion,
    wherein the at least one protrusion in a cross section parallel to the longitudinal axis of the contact part, the protrusion has a concave shape to form an undercut.

2. Electrical conductor according to claim 1, wherein the surface facing the flat conductor is formed in a relief shape, in particular in a regular relief shape, or in a bump shape, in particular in a regular bump shape, the protrusion in particular being formed as a bump.

3. Electrical conductor according to claim 1, wherein the at least one protrusion and/or at least one recess are arranged circumferentially, in particular coaxially circumferentially, about a center point of the surface facing the flat conductor.

4. Electrical conductor according to claim 1, wherein the at least one protrusion has part-circular surface portions, in particular in that the at least one protrusion has concave and convex regions.

5. Electrical conductor according to claim 3, wherein the at least one recess has part-circular surface sections, in particular that the at least one recess has convex regions.

6. Electrical conductor according to claim 1, wherein the contact part is metallically coated.

7. Electrical conductor according to claim 1, wherein the contact part is formed as a welding eye.

8. Electrical conductor according to claim 1, wherein the first section is formed in the form of a rod or a blank.

9. Electrical conductor according to claim 1, wherein the second section has a round or angular base surface.

10. Electrical conductor according to claim 1, wherein
    the first section has a substantially round outer circumference, and
    the first section has a through opening, the through opening being formed as a polygonal socket.

11. Electrical conductor according to claim 1, wherein the first and second sections are formed integrally.

12. Electrical conductor according to claim 1, wherein the first section is materially bonded on the inner diameter of the through-opening, in particular friction-welded.

13. Electrical conductor according to claim 1, wherein the flange is materially bonded to the flat conductor with its surface facing the flat conductor, in particular friction-welded.

14. Electrical conductor according to claim 1, wherein the outer circumference of the first section tapers from the second section in the axial direction of the through opening.

15. Electrical conductor according to claim 1, wherein the contact part is formed from a different metallic material than the flat conductor, in particular in that the flat conductor is formed from an aluminum material and the contact part is formed from a copper material, or in that the flat conductor is formed from a copper material and the contact part is formed from an aluminum material.

16. Contact part, for contacting with a flat conductor having at least one through opening, said contact part comprising:
    an axially extending first section and a radially extending second section,
    wherein the second section is formed as a flange and a side of the flange facing the first section has a surface having at least one protrusion,
    wherein the at least one protrusion in a cross section parallel to the longitudinal axis of the contact part, the protrusion has a concave shape to form an undercut.

17. Method of manufacturing an electrical conductor according to claim 1, wherein the contact part is welded to the flat conductor by means of resistance welding, in particular protrusion welding, friction welding, in particular rotation friction welding, or magnetic pulse welding.

18. Method according to claim 17, wherein the contact part is welded with its second section on the surface of the flat conductor.

19. Method according to claim 17, wherein during welding, a contact surface in the region of a protrusion is first brought into contact with the flat conductor, in that the material of the flat conductor in the region of the contact surface is plasticized by the energy introduced, and in that at least parts of the plasticized material of the flat conductor flow into a recess and harden in the recess after welding.

* * * * *

UNITED STATES PATENT AND TRADEMARK OFFICE
CERTIFICATE OF CORRECTION

| | | |
|---|---|---|
| PATENT NO. | : 11,394,131 B2 | |
| APPLICATION NO. | : 17/430214 | |
| DATED | : July 19, 2022 | |
| INVENTOR(S) | : Oliver Scharkowski | |

It is certified that error appears in the above-identified patent and that said Letters Patent is hereby corrected as shown below:

In the Claims

In Column 9, Lines 25-26:
Delete "at least one recess and/or"

Signed and Sealed this
Twenty-second Day of November, 2022

*Katherine Kelly Vidal*

Katherine Kelly Vidal
*Director of the United States Patent and Trademark Office*